United States Patent
Ambroladze et al.

(10) Patent No.: US 10,528,253 B2
(45) Date of Patent: Jan. 7, 2020

(54) INCREASED BANDWIDTH OF ORDERED STORES IN A NON-UNIFORM MEMORY SUBSYSTEM

(71) Applicant: INTERNATIONAL BUSINESS MACHINES CORPORATION, Armonk, NY (US)

(72) Inventors: Ekaterina M. Ambroladze, Los Angeles, CA (US); Garrett M. Drapala, Cary, NC (US); Norbert Hagspiel, Wendlingen (DE); Sascha Junghans, Ammerbuch (DE); Matthias Klein, Boeblingen (DE); Gary E. Strait, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 14/533,579

(22) Filed: Nov. 5, 2014

(65) Prior Publication Data

US 2016/0124854 A1 May 5, 2016

(51) Int. Cl.
*G06F 3/06* (2006.01)
*G06F 12/0842* (2016.01)
*G06F 13/42* (2006.01)

(52) U.S. Cl.
CPC .......... *G06F 3/0604* (2013.01); *G06F 3/0647* (2013.01); *G06F 3/0683* (2013.01); *G06F 12/0842* (2013.01); *G06F 13/4221* (2013.01); *G06F 2212/271* (2013.01); *G06F 2212/604* (2013.01)

(58) Field of Classification Search
CPC ............... G06F 3/0604; G06F 13/4221; G06F 12/0842; G06F 3/0683; G06F 3/0647; G06F 2212/271; G06F 2212/604
See application file for complete search history.

(56) References Cited

U.S. PATENT DOCUMENTS

| 5,829,010 A | 10/1998 | Cherabuddi |
| 6,687,809 B2 | 2/2004 | Chowdhury et al. |

(Continued)

OTHER PUBLICATIONS

Ambroladze et al., "Increased Bandwidth of Ordered Stores in a Non-Uniform Memory Subsystem", U.S. Appl. No. 14/946,015, filed Nov. 19, 2015.

(Continued)

*Primary Examiner* — David Yi
*Assistant Examiner* — Alan Otto
(74) *Attorney, Agent, or Firm* — Monchai Chuaychoo

(57) ABSTRACT

A method, computer program product, and system for maintaining a proper ordering of a data steam that includes two or more sequentially ordered stores, the data stream being moved to a destination memory device, the two or more sequentially ordered stores including at least a first store and a second store, wherein the first store is rejected by the destination memory device. A computer-implemented method includes sending the first store to the destination memory device. A conditional request is sent to the destination memory device for approval to send the second store to the destination memory device, the conditional request dependent upon successful completion of the first store. The second store is cancelled responsive to receiving a reject response corresponding to the first store.

13 Claims, 6 Drawing Sheets

(56) References Cited

U.S. PATENT DOCUMENTS

| | | | |
|---|---|---|---|
| 7,047,374 | B2 | 5/2006 | Sah et al. |
| 7,962,686 | B1 | 6/2011 | Tracht |
| 8,266,331 | B2 | 9/2012 | Freking et al. |
| 8,364,851 | B2 | 1/2013 | Kessler et al. |
| 2002/0040414 | A1 | 4/2002 | Uehara et al. |
| 2002/0147869 | A1* | 10/2002 | Owen ................... H04L 1/1671 710/105 |
| 2004/0024949 | A1 | 2/2004 | Winkler et al. |
| 2004/0172493 | A1 | 9/2004 | Askar |
| 2007/0055828 | A1 | 3/2007 | Tsien |
| 2008/0126602 | A1 | 5/2008 | Biran et al. |
| 2011/0320743 | A1 | 12/2011 | Hagspiel et al. |
| 2013/0305024 | A1* | 11/2013 | Krishnaswamy ..... G06F 9/3861 712/244 |
| 2014/0115268 | A1 | 4/2014 | Beers et al. |
| 2015/0019792 | A1* | 1/2015 | Swanson ................. G06F 9/466 711/102 |
| 2015/0032968 | A1* | 1/2015 | Heidelberger ...... G06F 12/0888 711/138 |
| 2016/0077991 | A1* | 3/2016 | Pascarella ........... G06F 13/4013 710/310 |

OTHER PUBLICATIONS

Appendix P—List of IBM Patents or Patent Applications Treated as Related. Filed Nov. 19, 2015. 2 pages.

Saibi, F. et al. "Integrating a PCI Express Digital IP Core into a Gigabit Ethernet Controller". Synopsys Inc. Copyright 2014. Design and Reuse. [online][Retrieved on: May 6, 2014]. <http://www.design-reuse.com/articles/14022/integrating-a-pci-express-digital-ip-core-into-a-gigabit-ethernet-controller.html>.

* cited by examiner

INCREASED BANDWIDTH OF ORDERED STORES IN A NON-UNIFORM MEMORY SUBSYSTEM

BACKGROUND OF THE INVENTION

The present invention relates generally to the field of data processing within a computing environment, and more particularly to ordered stores in a non-uniform memory subsystem at sufficient bandwidth to satisfy Peripheral Component Interconnect Express (PCIe) specifications.

A CPU cache is a cache used by the central processing unit (CPU) of a computer to reduce the average time to access data from system memory. The cache is a memory, smaller and faster than system memory. Most CPUs have different independent caches, including instruction and data caches, where the data cache is usually organized as a hierarchy of cache levels (L1, L2, L3, etc.)

PCIe, is a serial computer expansion bus standard designed to replace the older PCI (Peripheral Component Interconnect), PCI-X (Peripheral Component Interconnect eXtended), and AGP (Accelerated Graphics Port) bus standards.

Data originating from, for example, a hard drive I/O adapter, en route to system memory, may pass from a PCI Bridge Controller (PBC) to Level 3 cache (L3), or another cache level such as level 4 cache. The data may comprise a series of data packets, and the data packets must be stored, in L3 cache, in the proper order to avoid data corruption.

SUMMARY

Embodiments in accordance with the present invention disclose a method, computer program product, and system for maintaining a proper ordering of a data steam that includes two or more sequentially ordered stores, the data stream being moved to a destination memory device, the two or more sequentially ordered stores including at least a first store and a second store, wherein the first store is rejected by the destination memory device. A computer-implemented method includes sending the first store to the destination memory device. A conditional request is sent to the destination memory device for approval to send the second store to the destination memory device, the conditional request dependent upon successful completion of the first store. The second store is cancelled responsive to receiving a reject response corresponding to the first store.

DETAILED DESCRIPTION

Figure 1:
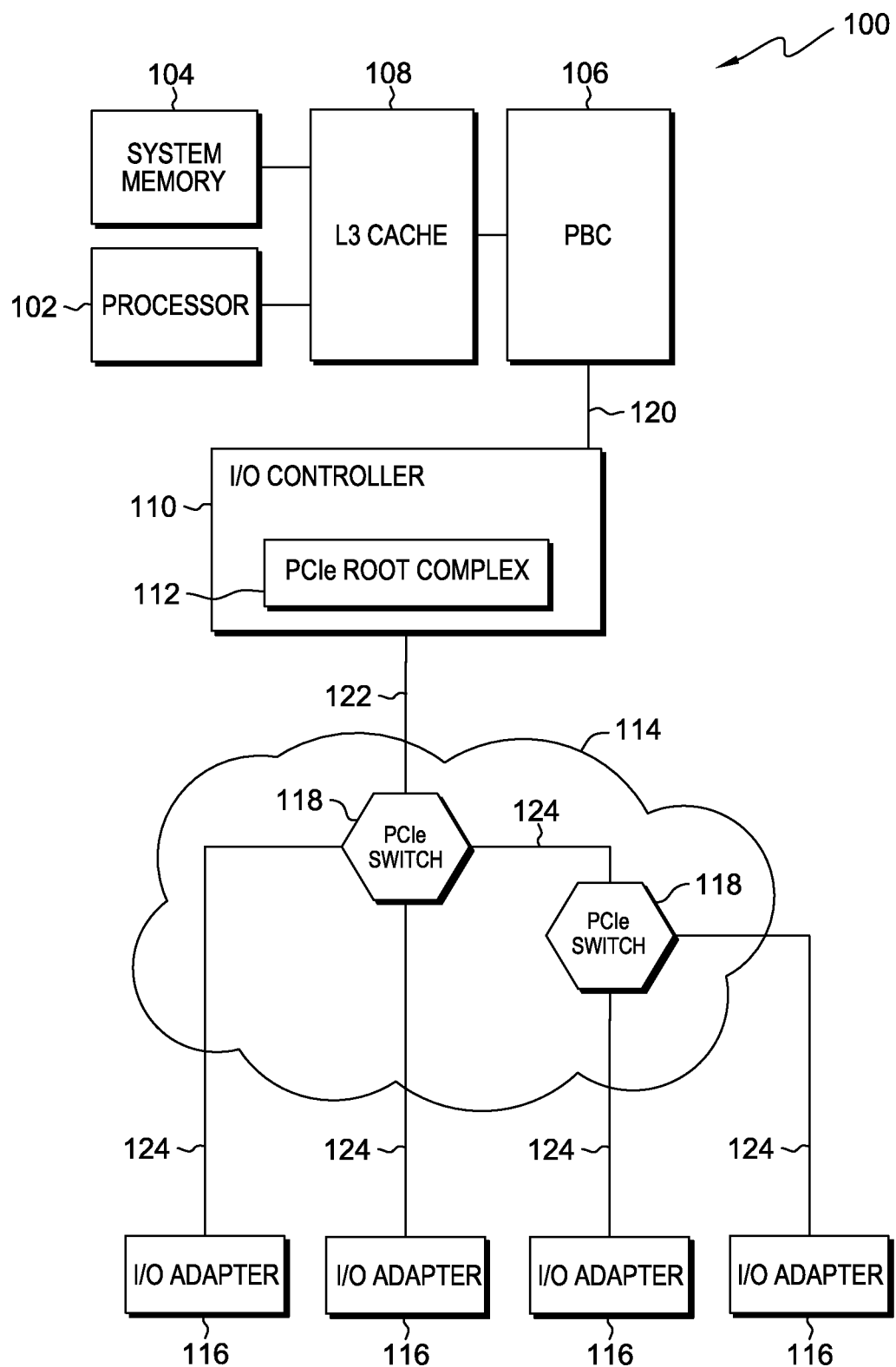
FIG. 1 is a block diagram of computing system 100 in which embodiments in accordance with the present invention may be implemented.

The Peripheral Component Interconnect Express (PCIe) standard specifies a minimum bandwidth for direct memory access (DMA) store traffic. A store operation, wherein a single data packet is to be stored from PCI bridge controller (PBC) to level 3 cache memory (L3), may comprise several sequential steps. As a simplified example, the steps may include: 1) PBC informs L3 that PBC has a data packet to store in L3 (PBC to L3—1st Request); 2) L3 secures the necessary resources and responds to PBC with an indication granting approval to send the data packet (L3 to PBC—First response; "Send Data"); 3) The data packet is transferred to L3 (PBC to L3—Data Transfer); and 4a) L3 responds to PBC that the store was successful (L3 to PBC—Final Response "Store Successful"); or 4b) L3 responds to PBC that the store was rejected (L3 to PBC—Final Response "Store Rejected").

A data stream comprises a sequence of data packets from the same originator, such as a particular input/output (I/O) adapter. For example, a 4 kiloByte data stream could comprise 16 sequential data packets of 256 Bytes, being copied from a hard drive I/O adapter into L3 cache memory.

In some embodiments in accordance with the present invention, a node identification (NID) is included in each data packet, the NID comprising, for example, 5 bits to identify up to 32 unique data stream originators. Data packets originating from a given device would carry the same NID. Data packets having the same NID are defined as belonging to the same data stream. Whereas the foregoing description of the NID is given as an example, other identification schemes could be adopted in various embodiments in accordance with the present invention.

During a DMA store operation, of a data stream comprising more than one data packet, particular attention must be paid to the ordering of the data packets as they are copied from the PCI bridge controller (PBC) to L3, such that the order of the packets comprising the data stream is preserved, as seen by software. For example, consider a data stream, being copied from PBC to L3, the data stream comprising a first packet designated "A" and a second packet, "B". Packet "A" must be stored before "B" to preserve the ordering integrity of the data stream. If "B," for any reason, is available in L3 before "A" is available, the data stream will be corrupted. In general, for a data stream comprised of any number of sequentially ordered data packets, the packets must be stored in the same relative order as they occupied in the original data stream, as seen by software. In embodiments in accordance with the present invention, the logic to keep track of the data stream ordering is implemented in the PBC.

In order to achieve a sufficiently high bandwidth for PCIe DMA store traffic, the steps to store a first packet in a data stream are intended to lead the steps to store a second packet in the data stream, so as to maintain the aforementioned proper ordering. While the sequence of individual steps to store the first packet must lead the sequence of individual steps to store the second packet, some of the steps to store the second packet may overlap some of the steps to store the first data packet. If for any reason, the first packet is delayed or rejected by the destination memory device, such that the second packet could overtake the first packet, the store operation for the data stream is stopped and re-started beginning with the first packet.

To implement the overlapped store operations, embodiments in accordance with the present invention introduce a conditional store procedure, whereby a store operation is launched conditionally, and L3 cache can reject a store should it become necessary to do so. In rejecting a store, L3 cache sends a reject response to the PBC. If L3 cache notifies the PBC that a preceding store operation was rejected, then subsequent stores of that data stream are not launched, or, if they have already launched, they are stopped. PBC then re-launches the conditional store operation beginning with the rejected data packet and continuing on in normal fashion with subsequent data packets.

Example embodiments in accordance with the present invention will now be described in detail with reference to the drawing figures. FIG. 1 is a block diagram of computing system 100 in which embodiments in accordance with the present invention may be implemented. Computing system 100 includes one or more processors 102 coupled to system memory 104 (main memory/computer memory) via a PCI bridge controller, hereinafter referred to as PBC 106. To access system memory 104, a processor 102 issues a read, write or modify request that includes an address used to access system memory 104. When computing system 100 is in operation, processor 102 is configured to execute instructions stored within system memory 104, to communicate data to and from system memory 104, and generally to control operations of computing system 100 in accordance with the instructions.

Processor 102 can be any custom-made or commercially available processor, a central processing unit (CPU), an auxiliary processor among several processors associated with the computer system, a semiconductor based microprocessor (in the form of a microchip or chip set), a macro-processor, or generally any device for executing instructions. In at least one embodiment in accordance with the present invention, processor 102 comprises a combination of hardware, software and/or firmware, with a computer program that, when loaded and executed, permits processor 102 to operate such that it carries out the methods described herein. Although only one processor 102 is depicted, computing system 100 may include additional processors. Processor 102, along with PBC 106 and an I/O controller, include the ordered store systems and methods as described herein.

Computing system 100 may comprise an I/O controller 110 with PCIe root complex 112. Computing system 100 may also comprise switching fabric 114 to route packetized communications between the root complex 112 and I/O adapters 116 or other peripheral devices. Switching fabric 114 may include a plurality of switching devices 118 to provide switching functionality Communication path 120 couples PBC 106 with I/O controller 110. Communication path 122 couples root complex 112 with switching devices 118, while communication paths 124 couple switching devices 118 with I/O adapters 116 each of which may require its stores to be completed in order. Although only two switching devices are illustrated in FIG. 1, the system may include any number of switching devices, which may be PCIe. Communication path 122 can be a PCIe-defined interface that allows one or more I/O adapters 116 to communicate with I/O controller 110 via PCIe switches 118. This allows certain classes of errors that are caused by one adapter not to affect the other devices sharing the same PCIe interface.

Figure 2:
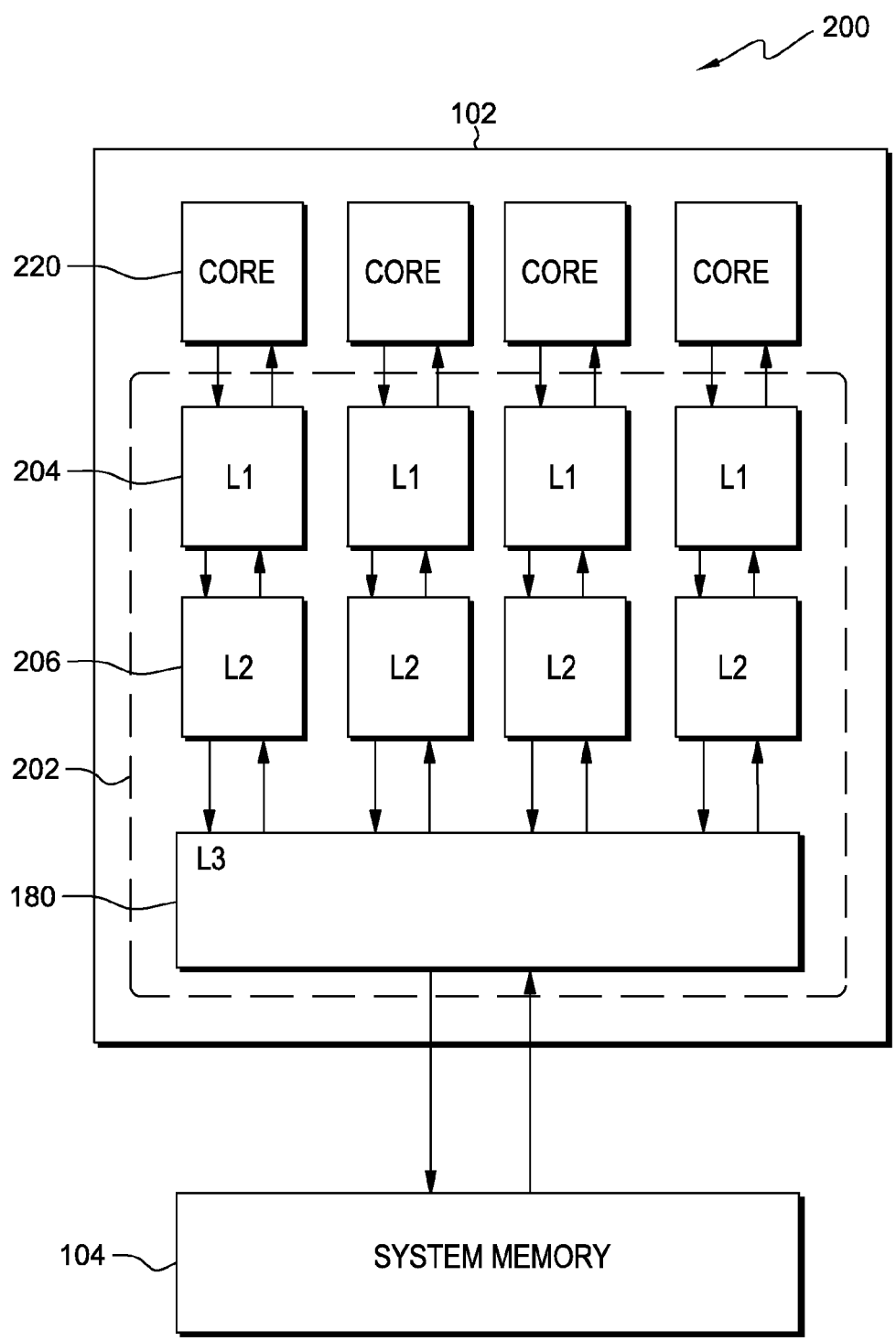
FIG. 2 is an illustration of processor 102 which includes a plurality of cores 220 and cache memory 202, in at least one embodiment in accordance with the present invention, generally designated with the numeral 200.

FIG. 2 is an illustration of processor 102 which includes a plurality of cores 220 and cache memory 202, in at least one embodiment in accordance with the present invention, generally designated with the numeral 200. Cache memory 202 is arranged in multiple levels wherein two levels, L1 cache 204 and L2 cache 206, are associated with a single core 220 as illustrated. Processor 102 also includes L3 cache 108 that is shared by the plurality of cores 220. It should be appreciated that the four cores 220 illustrated for processor 102 are illustrative only, and processor 102, in embodiments in accordance with the present invention, may have any number of cores 220. Moreover, it should also be appreciated that while this disclosure is concerned with stores directed from PBC 106 to L3 cache 108, any cache level, wherein stores could be directed, for example, from PBC 106 to a L4 cache, could be implemented in an embodiment in accordance with the present invention.

Cache memory 202 is a smaller, faster memory than system memory 104. Cache memory 202 may be used to store copies of data from system memory 104 locations. Through the use of cache memory 202, the average latency of memory accesses for processor 102 will be closer to the cache latency than to the latency of system memory 104. When processor 102 needs to read from or write to a location in system memory 104, it first checks whether a copy of that data is in cache memory 202. If so, processor 102 reads from or writes to cache memory 202, which is faster than reading from or writing to system memory 104. Checking for current copies of data, and establishing exclusive rights to update the data in a coherent fashion so that it is available to all other processors and I/O devices is known as coherency checking. Determining whether the data will be stored to system memory 104 or cache memory 202 is completed by processors 102 and PBC 106. A "send data" response is returned to I/O controller 110 when it is determined where the data will be stored. At this time the data is able to be stored in system memory 104 or cache memory 202. Writing of data to system memory 104 and cache memory 202 needs to maintain an ordered arrangement to maintain protocols of I/O controller 110.

In at least one embodiment in accordance with the present invention, cache memory 108 is an address-sliced type cache, built from multiple physically independent sub-caches, to provide improved performance. The slices are operated in parallel with different addresses. Cache memory 108 has two independent cache slices/sections, the first slice handles even addresses and the second slice handles odd addresses. The sliced cache memory arrangement can improve performance. During operation, the first store in a sequence may be transmitted to the first slice while the second store is transmitted to the second slice, and the third store is transmitted to the first slice again. As will be discussed in more detail herein, the ordered store management is maintained by a finite state machine (FSM). The store FSM and connected ordering logic see all of these stores, but since the cache memory is comprised of two slices, the cache handling the second store may not see either the first store or the third store at all. These multiple independent caches do not communicate, and therefore may not keep stores in order across the different cache memories. As will be described in more detail herein, the responses back from the caches to the store FSMs helps to keep multiple independent cache slices synchronized to get ordered stores accomplished in the desired sequence.

In at least one embodiment in accordance with the present invention, during operation, data is written to and retrieved from memory locations in cache memory 202 and system memory 104 and provided to processors 102. In general, I/O controller 110 does not require strict serialization, but rather that the results of the stores from the same I/O adapter 116 may not be seen out of order. Stores to memory from different I/O adapters 116 may be completed in any order or in parallel. Ordered stores to memory may occur in parallel, provided that the original unmodified contents of a first target address may not be read after an updated second target address is available for read. Further, if an ordered store fails to complete due to an error, then subsequent ordered stores from the same I/O adapter 116 may not be completed either.

While the PBC is referred to herein as a source memory device, various other memory devices, such as a hard drive or an I/O adapter could be considered to be a source memory devices. As used herein, the PBC is considered to be a source memory device when data flows through the PBC toward system memory. It is to be understood that in embodiments in accordance with the present invention, a source memory device could a memory device other than the PBC.

It is noted here that whereas the term "Level 3 cache", or "L3" are referred throughout this disclosure as a destination memory device, it is to be understood that a different level of cache, level 4 cache for example, could be used in embodiments in accordance with the present invention. Use of the term "Level 3 cache" or "L3" are not to be construed as limiting the destination memory device only to Level 3 cache. Moreover, while L3 is referred to as a destination memory device, it is to be understood that data en route to system memory, while it may pass through L3, for example, and L3 is referred to as a destination memory device, the data may actually be passing through L3 en route to system memory.

Figure 3:
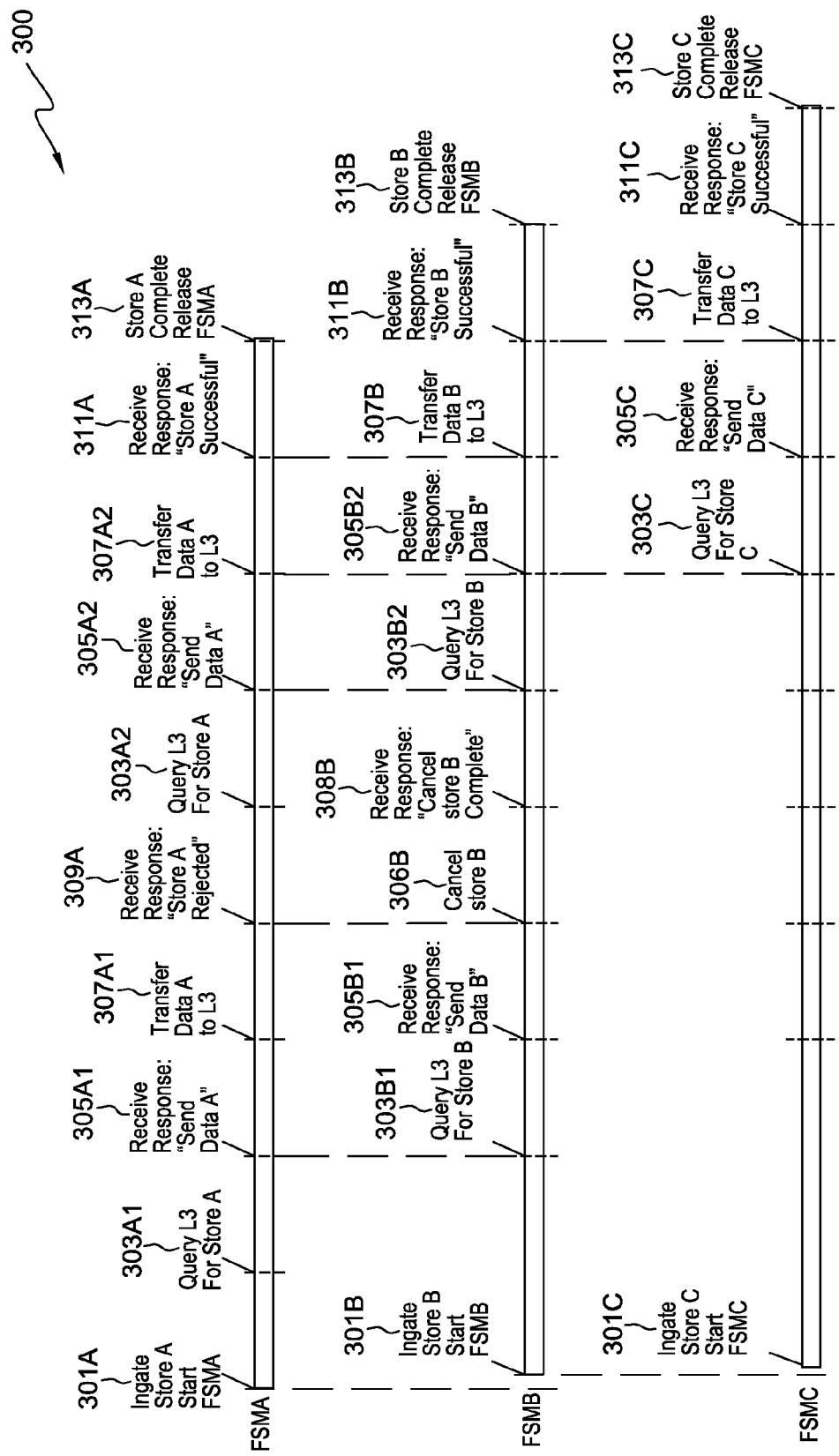
FIG. 3 is a timing chart, generally designated with numeral 300, not to scale, in which an example sequence of events are represented, events that may occur in an embodiment in accordance with the present invention, when three packets of data, from the same data stream, the packets designated as "A", "B" and "C" respectively, are to be stored in L3 in sequential order, and packet "A" is rejected.

FIG. 3 is a timing chart, generally designated with numeral 300, not to scale, in which an example sequence of events are represented, events that may occur in an embodiment in accordance with the present invention, when three packets of data, from the same data stream, the packets designated as "A", "B" and "C" respectively, are to be stored in L3 in sequential order, and packet "A" is rejected. For illustration, the three packets are to be stored in L3 in the order they arrive at the PBC, i.e., "A" first, "B" second and "C" last. Three finite state machines, FSMA, FSMB and FSMC respectively are assigned, to ingate and manage the respective stores (301A, 301B, and 301C respectively). A detailed description of a finite state machine, as embodied in accordance with the present invention, is found below with reference to FIG. 5.

FSMA sends a query to L3 to store packet "A" (303A1). FSMA, FSMB and FSMC receive a grant response from L3 to send packet "A" (305A1). Responsive to receipt of the grant response relative to packet "A", FSMA begins transfer of packet "A" to L3 (307A1). Responsive to receipt of the grant response relative to packet "A", FSMB sends a query to L3 to store packet "B" (303B1). FSMA, FSMB and FSMC receive a grant response from L3 to send packet "B" (305B1).

FSMA initiates transfer of packet "A" to L3 (307A1). FSMA, FSMB and FSMC receive a reject response from L3 relative to packet "A" (309A). Responsive to receipt of the reject response (309A) relative to packet "A", FSMB sends a cancel order to L3, relative to packet "B" (306B). FSMB sends the cancel order to L3 because FSMB had, in addition to receiving the reject response relative to packet "A" (309A), also received a "send data B" response from L3 (305B1). FSMB receives a response "Cancel complete" relative to packet "B" (308B), indicating that L3 had completed operations to cancel the conditional store of packet "B".

As to FSMC, even though FSMC has received the reject response relative to packet "A" (309A), FSMC has not yet sent a query to L3 to store packet "C", and therefore, does not need to cancel store "C". In another embodiment in accordance with the present invention, FSMC would send a command to L3 cancelling store "C", notwithstanding the fact that it had not yet sent in a query to L3 to store packet "C".

FSMA recovers from the reject by resending its query to L3 to store packet "A" (303A2). FSMA, FSMB and FSMC receive a grant response from L3 to send packet "A" (305A2). Responsive to receipt of the grant response relative to packet "A", FSMA begins to transfer packet "A" to L3 (307A2). Responsive to receipt of the grant response relative to packet "A", FSMB will resend its query to L3 to store packet "B" (303B2). FSMA, FSMB and FSMC receive a grant response from L3 to send packet "B" (305B2). Responsive to receipt of the grant response relative to packet "B", FSMC sends a query to L3 to store packet "C" (303C).

FSMA, FSMB and FSMC receive a response from L3 indicating store A is successful (311A), responsive to which FSMA is released and enters an idle state (313A). Responsive to receiving the response from L3 indicating store A is successful (311A), FSMB sends packet "B" to L3 (307B). FSMB and FSMC receive a grant response from L3 to send packet "C" (305C). FSMB and FSMC receive a response from L3 indicating store B is successful (311B), responsive to which FSMB is released and enters an idle state (313B). Responsive to receiving the response from L3 indicating store B is successful (311B), FSMC sends packet "C" to L3 (307C). FSMC receives a response from L3 indicating store C is successful (311C), responsive to which FSMC is released and enters an idle state (313C), completing the store of the data stream comprising packets "A", "B" and "C".

The foregoing sequence of events can be summarized as follows: Operations to store a data stream comprising packets "A", "B" and "C", from PBC to L3, are in respective stages of progress, "A" having started first, followed by "B" and then "C". When a first attempt to store packet "A" is rejected by L3, progress on packets "B" and "C" is cancelled, so that "B" and "C" do not get stored out of order. Then the process is restarted beginning again with "A".

Figure 4:
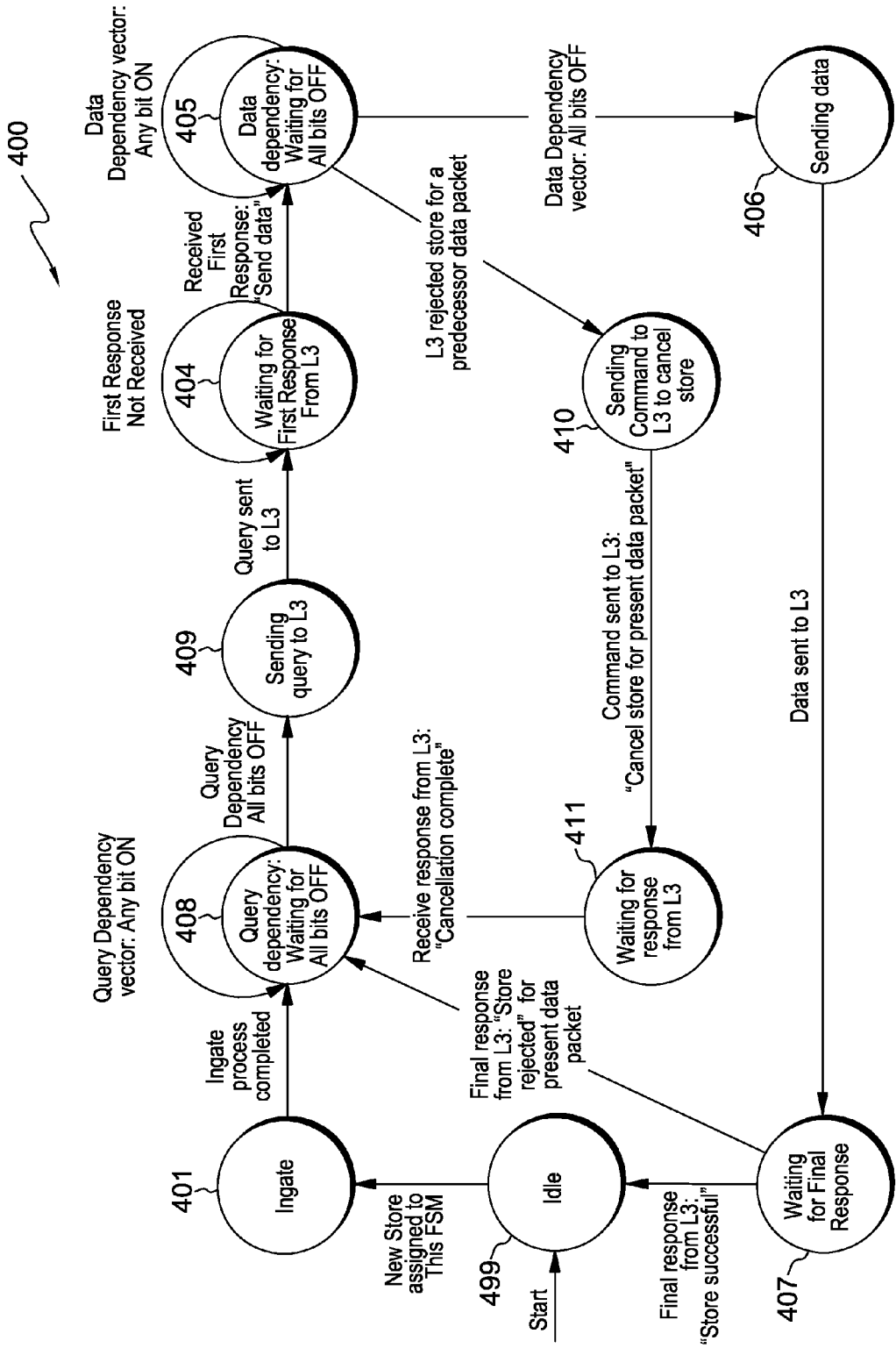
FIG. 4 is a state diagram of a finite state machine (FSM), generally designated with numeral 400, which manages a store operation in embodiments in accordance with the present invention.

FIG. 4 is a state diagram of a finite state machine (FSM), generally designated with numeral 400, which manages a store operation in embodiments in accordance with the present invention. An FSM is assigned to manage the store of each data packet, there being a one-to-one relationship of a data packet to a respective FSM. The FSM is operationally coupled with the PBC. The FSM implements logic to ensure proper ordering of data packets comprising a data stream, as the data stream is stored from PBC to L3. In an implementation, there may be a limited number of FSMs available, wherein, if all FSMs are active when a new store arrives at PBC, the new store waits until an active FSM is released and returned to an idle state, after which the idle FSM can be assigned to manage the new store.

There is no correlation between the order of the data packets in a data stream and FSMs assigned to manage the stores. A data packet can be assigned to an FSM as the FSM becomes available. To illustrate this point, we stipulate that an example system has available 16 FSMs and 16 FSMs are in operation when a data stream composed of 3 data packets, "A", "B" and "C" arrives at PBC for storing in L3. The first packet, packet "A" is assigned to the first available FSM. We stipulate that FSM10 is first to become available and is assigned to manage the store of packet "A". At some time later, FSM2 becomes available and is assigned to manage the store of packet "B". Still later, FSM12 becomes available and is assigned to manage the store of packet "C". Due to the functioning of the FSMs, operating in conjunction with their associated dependency vectors, the stores of "A", "B" and "C" will be processed in the proper order, notwithstanding the apparent contradictory order (FSM10, FSM2, FSM12) of the FSMs managing the stores. Further details can be found with reference to FIGS. 4 and 5, and the detailed descriptions thereof.

Referring now to FIG. 4, the state diagram description begins with an FSM at an idle state (state 499). Responsive to being assigned a new store, the FSM enters ingate (state 401). At ingate, initializing functions may be performed, including populating a query dependency vector and a data dependency vector, and coupling the query dependency vector and the data dependency vector with the FSM. A query dependency vector and a data dependency vector are each coupled to the FSM and integral to its operation. In embodiments in accordance with the present invention, there is one query dependency vector and one data dependency vector coupled to the FSM.

In embodiments in accordance with the present invention, a dependency vector is a register, comprising a number of bits equal to or greater than the total number of FSMs active at the time of ingate. The number of FSMs active at the time of ingate include the FSM to which the dependency vectors are dedicated. Bits in the data and query dependency vectors correspond to respective FSMs. A more detailed discussion of the query and data dependency vectors is given with reference to FIG. 5.

The initial conditions of the dependency vectors (i.e., the ON or OFF states of the individual bits contained in the vectors) for an FSM are determined at ingate of the FSM. Thus, in a system that is operating with fifteen active FSMs, for example, FSM0 through FSM2 and FSM4 through FSM15, if a new store arrives and is assigned to FSM3, the query and data dependency vectors dedicated to FSM3 will each include 16 bits representing FSM0 through FSM15 respectively. Continuing the example, suppose FSM3 represents a data packet in a data stream where FSM3 is preceded by FSM0, FSM1, FSM9 and FSM12. All bits other than bits 0, 1, 9 and 12, in both dependency vectors will be initialized to 0, whereas bits 0, 1, 9 and 12 in both vectors will be initialized to 1. The initialized dependency vectors can each be represented in this example as: [1100 0000 0100 1000], the '1's representing FSM0, FSM1, FSM9, and FSM12 respectively.

For clarity throughout this disclosure and in the figures, the following terminology will be used with respect to the state of individual bits in the dependency vectors. A bit can be in one of two states: ON or OFF, alternately represented as 1 or 0 respectively. A condition that switches a bit ON (1) is referred to as a SET condition or a SET signal. A condition that switches a bit OFF (0) is referred to as a RESET condition or a RESET signal.

In embodiments in accordance with the present invention, bits in the dependency vectors are implemented as flip-flops, i.e., if a bit receives a SET signal, the bit assumes the ON state and remains ON, unless it receives a subsequent RESET signal, responsive to which it assumes an OFF state and remains OFF, unless it receives a subsequent SET signal.

Responsive to completion of ingate, an FSM enters state 408 [Query dependency: Waiting for all bits OFF]. If any bit in the query dependency vector is ON (meaning there exists at least one other FSM which preceded the current FSM, the store operation for which has not been completed), the current FSM remains in state 408.

Responsive to all bits of the query dependency being OFF, the FSM transitions to state 409 [Sending query to L3] which when completed [query sent to L3], transitions the FSM to state 404 [Waiting for First Response from L3]. In response to receiving a first response [Received first response: "send data"], the FSM transitions to state 405 [Data dependency: Waiting for all bits OFF].

Responsive to all data dependency vector bits being set to OFF [Data dependency vector: All bits off], the FSM transitions to state 406 [Sending data]. After data transfer to L3 is complete [Data sent to L3], the FSM transitions to state 407 [Waiting for final response]. Responsive to receiving the final response from L3 [Final response from L3: "Store successful"], the FSM transitions to state 499 [Idle]. If the final response from L3 indicates an unsuccessful store [Final response from L3: "Store rejected" for present data packet], the FSM transitions again to state 408 [Query dependency: Waiting for all bits OFF].

From state 405, if L3 rejected a store for a predecessor finite state machine, the FSM transitions to state 410 [Requesting L3 to cancel store] and then to state 411 [Waiting for response from L3]. In response to receiving a "cancellation complete" response from L3, the FSM transitions again to state 408 [Query dependency: Waiting for all bits OFF].

Figure 5:
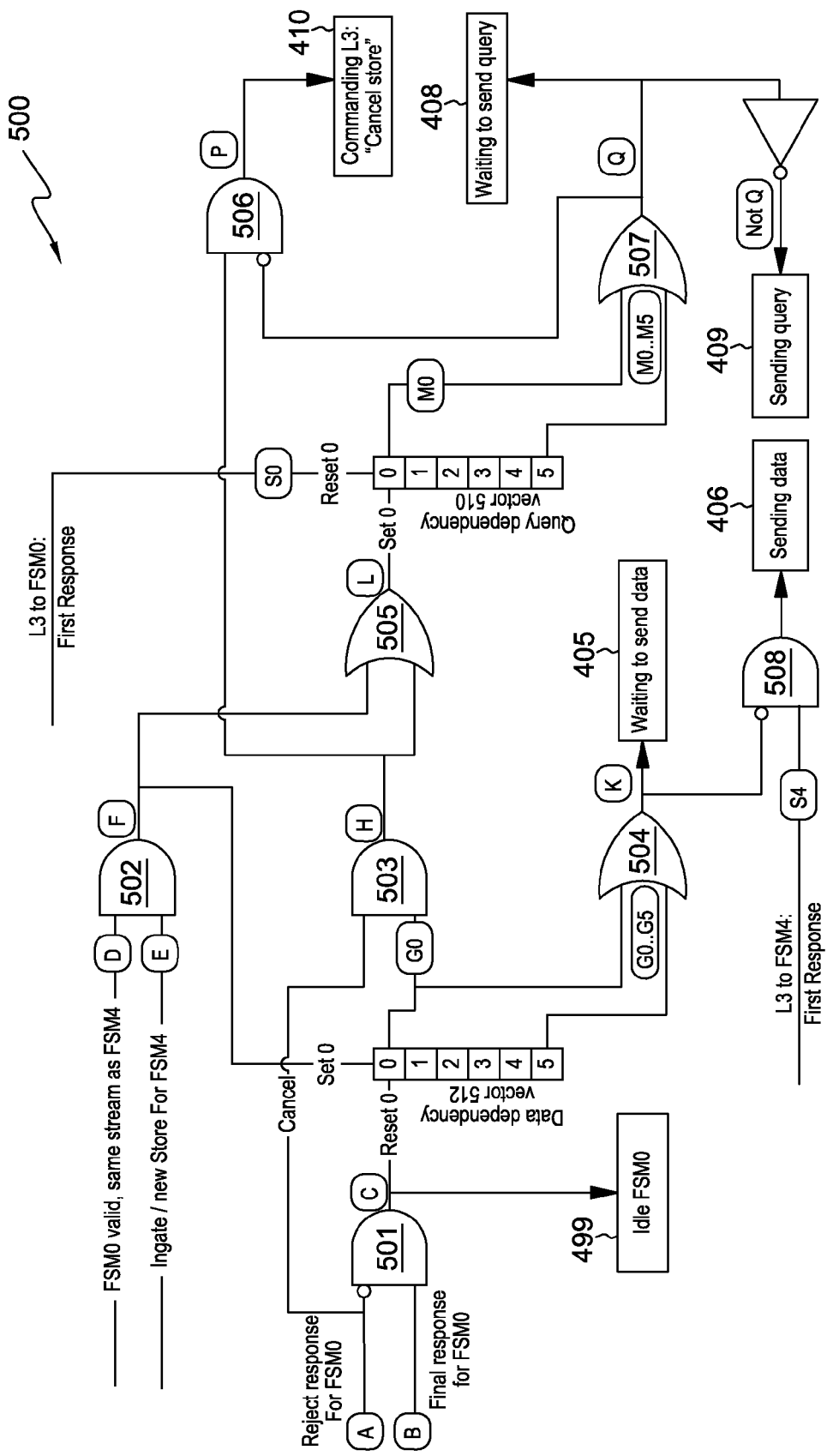
FIG. 5 is a logic diagram, generally designated with numeral 500, illustrating the logical conditions and operation of the dependency functions of a FSM discussed above with respect to FIG. 4, in at least one embodiment in accordance with the present invention.

FIG. 5 is a logic diagram, generally designated with numeral 500, illustrating the logical conditions and operation of the dependency functions of the FSM discussed above with respect to FIG. 4, in at least one embodiment in accordance with the present invention. Throughout the detailed description of FIG. 5, when describing various states of the dependency vectors, the following nomenclature will be used: Six dependency vector bits in the following example will be represented as a linear vector [FSM0, FSM1, FSM2, FSM3, FSM4, FSM5]. When describing states of the various logic signals, the term HIGH will be used to denote a logical "1" or "True" and the term LOW will be used to denote a logical "0" or "False".

In embodiments in accordance with the present invention, as previously discussed, a store is managed by a finite state machine (FSM). FIG. 5 illustrates an example data stream comprised of two data packets, the storing of each packet managed by a respective finite state machine. In this illustration, the storing of the data packets is managed by FSM0 and FSM4 respectively. Each FSM "owns" a query dependency vector 510 and a data dependency vector 512. In this example, there are in operation other FSMs as well: FSM1, FSM2, FSM3 and FSM5. In the case illustrated, these other FSMs are not of the same data stream as FSM0 and FSM4 and therefore are not factors in the operations of FSM0 and FSM4. FSM1, FSM2, FSM3 and FSM5 are included in the illustration merely to demonstrate the method wherein all valid FSMs are represented in the dependency vectors.

Referring now to FIG. 5, at ingate for FSM4, FSM0 is found to be valid and of the same data stream as FSM4, (signals D and E are HIGH), forcing output of AND gate 502 to go HIGH. Signal F may remain HIGH for one clock cycle only, which is a time interval sufficient to SET the respective bits in the query dependency vector 510 and data dependency vector 512.

Also at ingate for FSM4, other valid FSMs are found, comprising FSM1, FSM2, FSM3, and FSM5. An FSM is referred to as "valid" when the FSM is at any state other than idle 499. When a new store is assigned to an FSM, the FSM transitions to ingate 401, thus becoming valid, and remains valid until it transitions to idle 499. Transition to idle 499 occurs when a final response is received from L3 indicating the store (being managed by the FSM) was successful.

In response to signal F going HIGH, bit 0 of data dependency vector 512 is SET and bit 0 of query dependency vector 510 is SET due to signal F input to OR gate 505, forcing output signal L to go HIGH. Thus, query and data dependency vectors 510 and 512 respectively, owned by FSM4, are initialized as [100000] (bit 0, in both vectors, is ON indicating FSM0 precedes FSM4 in the data stream of FSM4). Bits 1, 2, 3, and 5 (representing FSM1, FSM2, FSM3 and FSM5 respectively) are OFF indicating the respective FSMs do not precede FSM4 in FSM4's data stream. Bit 4, representing FSM4, is OFF. In general, the bit representing an FSM in the FSM's own dependency vector (Bit 4 in this example) must be OFF to avoid a condition wherein the FSM would have to wait for itself to finish, before it can proceed to finish, a logical tautology that would cause a deadlock condition were it allowed to occur.

In at least one embodiment in accordance with the present invention, FSM0 is determined to be a predecessor of FSM4 by finding, during ingate of FSM4, that the data packet controlled by FSM0 carries the same NID as carried by the data packet controlled by FSM4.

Continuing with the present illustrative example, inputs to OR gate 507 comprise the bits of query dependency vector 510, the bits represented by signals M0 through M5. Output signal Q from OR gate 507 is HIGH because at least one bit (M0 in this illustration) is ON. FSM4 thus remains in state 408.

Responsive to receiving a first response from L3, relative to FSM0, signal S0 goes HIGH and bit 0 in query dependency vector 510 is RESET. Contents of query dependency vector 510 are now [000000]. In consequence to all bits in query dependency vector 510 being OFF, signal Q goes LOW, the inverse of which causes FSM4 to transition to state 409, wherein FSM4 can issue its conditional store request to L3.

It is noted that the first response signal from L3 to FSM0, is sent to all valid FSMs including FSM4 and is represented as signal S0 in FIG. 5. Similarly, if L3 were to issue a first response to FSM1, a RESET signal S1 (not shown) would be received at all valid FSMs including FSM4, though in this example, the RESET signal S1 (not shown) would have no effect on query dependence vector 510 because bit 1 is already OFF (because FSM1 is not a predecessor to FSM4).

To summarize the foregoing, FSM4 does not issue a conditional store request to L3 until after all predecessors in its data stream (in the present example, only FSM0) have received a first response ("Send in the data") from L3.

In a case where FSM4 has issued its conditional store request to L3, but the FSM0 data transfer to L3 fails (is rejected by L3), the following sequence is triggered: L3 issues a final response to FSM0 (signal B is HIGH) and the final response is a reject response (signal A is HIGH). Inputs to AND gate 503 comprise signal A, which is HIGH, and signal G0, which is HIGH due to bit 0 in data dependency vector 512 being ON. Output from AND gate 503, signal H, is therefore forced HIGH, which leads to at least two consequences including: 1) At this time, Q is LOW, therefore input to AND gate 506, NOT Q, is HIGH, and H is HIGH, forcing output P to go HIGH. This causes FSM4 to transition to state 410, in which FSM4 issues a command to L3 to cancel the store operation for which FSM4 has already sent in a conditional store request; and 2) Input H to OR gate 505 causes output L to go HIGH, which SETs bit 0 in query dependency vector 510 and forces output Q from OR gate 507 to go HIGH, transitioning FSM4 back to state 408. It is noted here that signal H, once set HIGH, may remain HIGH for one clock cycle only. Moreover, note that FSM4 is transitioned to state 410 before FSM4 is transitioned to state 408, due to the delay of output of OR gate 505 in response to input signal H. The function of AND gate 506 is to inhibit an FSM from issuing to L3 a command to "cancel store" if the FSM had not previously issued its conditional store request.

To summarize the foregoing, once FSM4 has begun the store process, if any predecessor (in this illustration, only FSM0) is rejected by L3, FSM4 must cancel its store operation and returns to state 408 in which it waits until query dependency vector 510 is cleared (all bits=0). This is how the pending FSM4 store is stopped and re-rolled, so as to avoid corrupting the proper ordering of the stores of its data stream.

Now we describe a sequence when FSM0 store is successful, after which the FSM4 store may proceed. The following sequence can occur during nominal store operations (wherein none of the data packets is rejected), as well as after the previously described FSM0-reject/FSM4-cancel scenario.

Query dependency vector 510 and data dependency vector 512 equal [100000]. FSM0 recovers from the rejection by issuing its conditional store request to L3, after which L3 sends a first response to FSM0. This is again represented within FSM4 by signal S0 going HIGH, thus RESETTING bit 0 in query dependency vector 510 [now 000000] and resulting in output Q, from OR gate 507, going LOW, the inverse of which transitions FSM4 to state 409 in which FSM4 may send in its conditional store request to L3. Meanwhile, when FSM0 has successfully transferred its data to L3 and L3 issues a final response to FSM0 (signal B is HIGH), and the final response is not a "reject" response (signal A is LOW). Inputs to AND gate 501 (B and NOT A) are both HIGH, driving output C HIGH, which resets bit 0 in data dependency vector 512, and transitions FSM0 to idle state 499. FSM0 is now released and available to be assigned to manage another store, and FSM4 is no longer dependent on FSM0.

Data dependency vector 512, now [000000], forcing OR gate 504 output K to go LOW, which inverts to a HIGH input to AND gate 508. When L3 issues a first response to FSM4, signal S4 goes HIGH. Both inputs to AND gate 508 being HIGH, FSM4 is transitioned to state 406 and FSM4 may then send in the data.

To summarize the foregoing, once predecessor FSM0 has successfully completed its store into L3, and L3 has given approval to FSM4 to send in its data, FSM4 can then proceed to send the data to L3.

Figure 6:
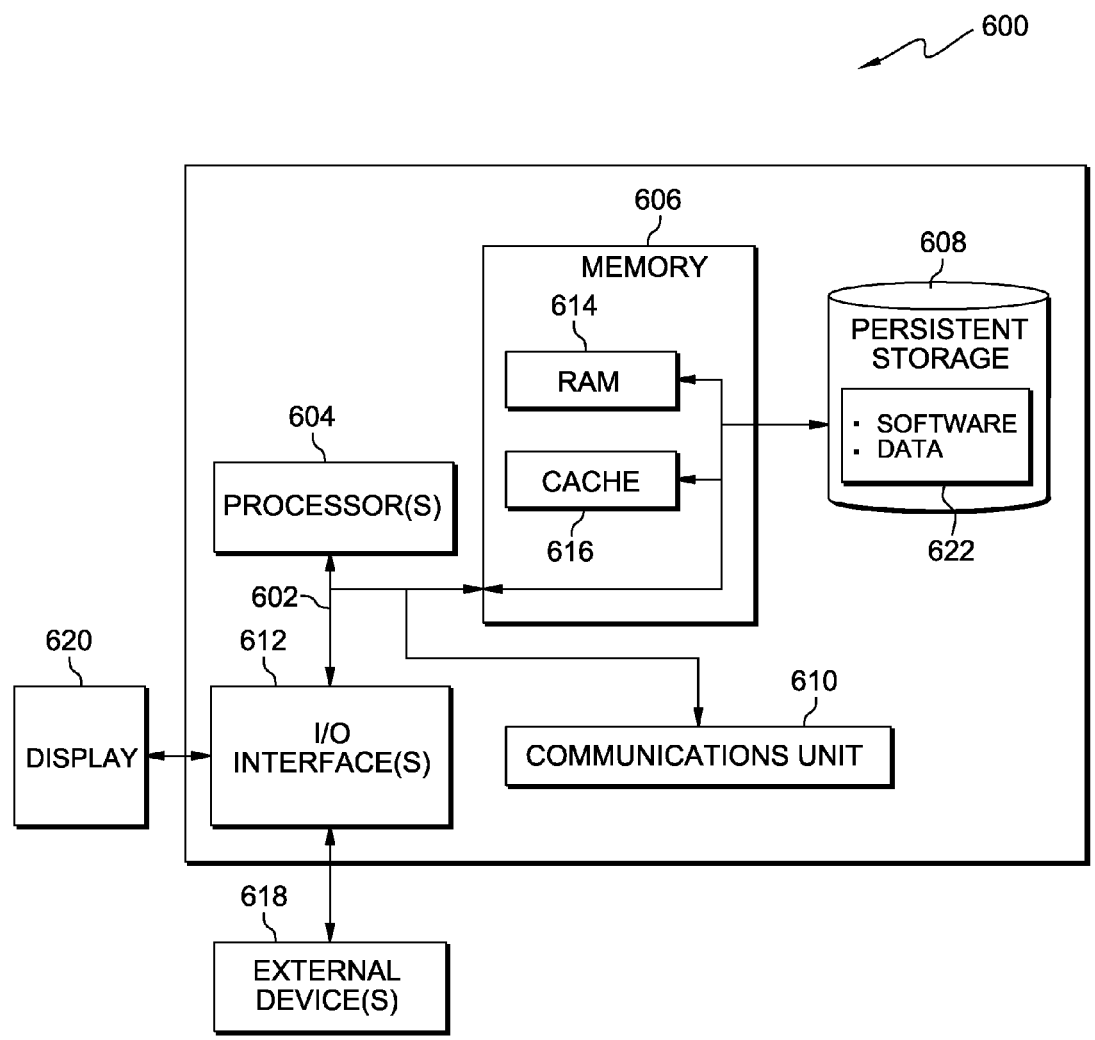
FIG. 6 depicts a block diagram of components of processor 102, generally designated with numeral 600, in accordance with an illustrative embodiment of the present invention.

FIG. 6 depicts a block diagram of components of processor 102, generally designated with numeral 600, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made. For example, processor 102 may comprise components spread through multiple systems and resources and may provide systems and resources beyond what is necessary to operate embodiments of the present invention.

Processor 102 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage medium.

Computer programs and processes are stored in persistent storage 608 for execution by one or more of computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, a field programmable gate array, an implementation of hard-wired logic, read-only memory (ROM), erasable programmable read-only memory (EPROM), flash memory, or any other computer-readable storage medium that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including systems and devices within or controlled by processor 102. In these examples, communications unit 610 includes one or more wireless network interface cards. Communications unit 610 may provide communications through the use of either or both physical and wireless communications links Computer programs and processes may be downloaded to persistent storage 608 through communications unit 610.

I/O interface(s) 612 allows for input and output of data with other devices that may be connected to processor 102. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 608 via I/O interface(s) 612. I/O interface(s) 612 may also connect to a display 620.

Display 620 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer program product implemented in a PCI (Peripheral Component Interconnect) Bridge Controller to maintain a proper ordering of a data stream that includes two or more sequentially ordered stores, the data stream being moved to a destination memory device, the two or more sequentially ordered stores including at least a first store and a second store, the computer program product comprising:
   one or more computer readable tangible storage media; and
   program instructions stored on at least one of the one or more computer readable tangible storage media, the program instructions comprising:
   program instructions to send data to the first store from a source memory device to the destination memory device, wherein the destination memory device is a volatile memory device and wherein the first store is assigned a first finite state machine (FSM) and the first FSM of the first store contains a first query dependency vector and a first data dependency vector;
   program instructions to set bits of the first query dependency vector to off and set bits of the first data dependency vector to off and a second FSM is assigned to the second store, wherein the second FSM contains a second query dependency vector and a second data dependency vector;
   program instructions to send a conditional request to the destination memory device for approval to send the second store to the destination memory device upon receipt of the approval, the sending of the second store being dependent upon successful completion of the first store wherein bits of the second query dependency vector is set to off and bits of the second data dependency vector is set to off; and
   program instructions to send a command to the destination memory device to cancel the second store whether the second store has been sent to the destination memory device or has not been sent to the destination memory device, responsive to receiving a reject response corresponding to the first store, wherein the bits of the first query dependency vector is set to off.

2. The computer program product in accordance with claim 1, wherein program instructions to send, by one or more processors, the first store from a source memory device to the destination memory device further comprise:
   program instructions to send the first store from the PCI (Peripheral Component Interconnect) Bridge Controller to a destination memory device.

3. The computer program product in accordance with claim 1, wherein program instructions to send the first store from a source memory device to the destination memory device further comprise:
   program instructions to send the first store from a source memory device to a level 3 cache memory.

4. The computer program product in accordance with claim 1, wherein program instructions to cancel the second store responsive to receiving a reject response corresponding to the first store, comprise:
  program instructions to send a signal to the destination memory device to cancel the conditional request;
  program instructions to receive a signal indicating that the destination memory device has completed operations to cancel the conditional request;
  program instructions to resend the first store to the destination memory device; and
  program instructions to resend a request for approval to send the second store, the request for approval conditional upon successful completion of the first store.

5. The computer program product in accordance with claim 1 further comprising:
  program instructions to manage a store, through a finite state machine, wherein the finite state machine is operationally coupled to a query dependency vector and a data dependency vector.

6. The computer program product in accordance with claim 5, wherein coupling a finite state machine to a query dependency vector further comprises:
  program instructions to send a signal to the finite state machine, to indicate a state of a predecessor finite state machine with respect to sending a conditional store request.

7. The computer program product in accordance with claim 5, wherein coupling a finite state machine to a data dependency vector further comprises:
  program instructions to send, a signal to the finite state machine, to indicate a state of a predecessor finite state machine with respect to sending a data packet to the destination memory device.

8. A computer system implemented in a PCI (Peripheral Component Interconnect) Bridge Controller to maintain a proper ordering of a data stream that includes two or more sequentially ordered stores, the data stream being moved to a destination memory device, the two or more sequentially ordered stores including at least a first store and a second store, the computer system comprising:
  one or more computer processors;
  one or more computer readable tangible storage media; and
  program instructions stored on at least one of the one or more computer readable tangible storage media, the program instructions comprising:
  program instructions to send data to the first store from a source memory device to the destination memory device, wherein the destination memory device is a volatile memory device and wherein the first store is assigned a first finite state machine (FSM) and the first FSM of the first store contains a first query dependency vector and a first data dependency vector;
  program instructions to set the bits of the first query dependency vector to off and set the bits of the first data dependency vector to off and a second FSM is assigned to the second store, wherein the second FSM contains a second query dependency vector and a second data dependency vector;
  program instructions to send a conditional request to the destination memory device for approval to send the second store to the destination memory device upon receipt of the approval, the sending of the second store being dependent upon successful completion of the first store wherein bits of the second query dependency vector is set to off and bits of the second data dependency vector is set to off; and
  program instructions to send a command to the destination memory device to cancel the second store whether the second store has been sent to the destination memory device or has not been sent to the destination memory device, responsive to receiving a reject response corresponding to the first store, wherein the bits of the first query dependency vector is set to off.

9. The computer system in accordance with claim 8, wherein program instructions to send, by one or more processors, the first store from a source memory device to the destination memory device further comprise:
  program instructions to send the first store from the PCI (Peripheral Component Interconnect) Bridge Controller to a destination memory device.

10. The computer system in accordance with claim 8, wherein program instructions to send the first store from a source memory device to the destination memory device further comprise:
  program instructions to send the first store from a source memory device to a level 3 cache memory.

11. The computer system in accordance with claim 8, wherein program instructions to cancel the second store responsive to receiving a reject response corresponding to the first store, comprise:
  program instructions to send a signal to the destination memory device to cancel the conditional request;
  program instructions to receive a signal indicating that the destination memory device has completed operations to cancel the conditional request;
  program instructions to resend the first store to the destination memory device; and
  program instructions to resend a request for approval to send the second store, the request for approval conditional upon successful completion of the first store.

12. The computer system in accordance with claim 8 further comprising:
  program instructions to manage a store, through a finite state machine, wherein the finite state machine is operationally coupled to a query dependency vector and a data dependency vector.

13. The computer system in accordance with claim 12, wherein coupling a finite state machine to a query dependency vector and a data dependency vector further comprises:
  program instructions to signal to the finite state machine the state of a predecessor finite state machine with respect to sending a conditional store request; and
  program instructions to signal to the finite state machine a state of a predecessor finite state machine with respect to sending a data packet to the destination memory device.

* * * * *